(12) United States Patent  
Meyer

(10) Patent No.: US 6,282,979 B1  
(45) Date of Patent: Sep. 4, 2001

(54) ADJUSTMENT ASSEMBLY FOR AN INTEGRAL SHIFTER CABLE INTERLOCK

(75) Inventor: Klemens J. Meyer, Northville, MI (US)

(73) Assignee: Teleflex Incorporated, Plymouth Meeting, PA (US)

( * ) Notice: Subject to any disclaimer, the term of this patent is extended or adjusted under 35 U.S.C. 154(b) by 0 days.

(21) Appl. No.: 09/443,792

(22) Filed: Nov. 19, 1999

(51) Int. Cl.[7] ................................. F16C 1/10; F16B 7/10
(52) U.S. Cl. ................ 74/502.4; 74/502.6; 74/500.5; 74/501.5 R; 403/319; 403/379.1; 403/104
(58) Field of Search ............................ 74/501.5 R–502.6; 403/154, 379.1, 155, 376, 319, 104

(56) References Cited

U.S. PATENT DOCUMENTS

| 4,987,968 | 1/1991 | Martus et al. . | |
|---|---|---|---|
| 5,076,114 | 12/1991 | Moody . | |
| 5,176,231 | 1/1993 | Moody et al. . | |
| 5,489,246 | 2/1996 | Moody et al. . | |
| 5,522,277 | 6/1996 | Bollinger . | |
| 5,584,212 | * 12/1996 | Wild ................................. | 74/502.6 |
| 5,588,334 | * 12/1996 | Lu et al. .............................. | 74/502.6 |
| 5,598,743 | * 2/1997 | Yasuda ................................ | 74/502.4 |
| 5,647,818 | 7/1997 | Moody . | |
| 5,921,143 | * 7/1999 | Castillo et al. ..................... | 74/502.4 |
| 5,934,150 | * 8/1999 | Srinivas et al. .................... | 74/502.4 |
| 6,109,132 | * 8/2000 | Frye .................................... | 74/502.4 |

* cited by examiner

*Primary Examiner*—Vinh T. Luong  
(74) *Attorney, Agent, or Firm*—Howard & Howard

(57) ABSTRACT

An adjustment assembly (10) for an integral shifter cable interlock is provided. The assembly includes (10) a cable assembly (11) having a conduit (12) defining an axis and a core element (14) disposed within the conduit (12) movable along the axis. A terminal assembly (15) is secured to a portion of the core element (14) and has an aperture (37). An interlock housing (24) is supported by the cable assembly (11) with the terminal assembly at least partially disposed within the interlock housing (24). An interlock device (46) is disposed within the interlock housing (24) and has an armature pin (48) transverse to the aperture (37) for coacting with the aperture (37) and preventing axial movement of the core element (14). The adjustment assembly (10) is characterized by a removable clip (50) interposed between the interlock housing (24) and the terminal assembly (15) for locating the aperture (37) relative to the armature pin (48).

9 Claims, 5 Drawing Sheets

ADJUSTMENT ASSEMBLY FOR AN INTEGRAL SHIFTER CABLE INTERLOCK

BACKGROUND OF THE INVENTION

1. Field of the Invention

The present invention relates to a shifter cable assembly having an interlock device integral therewith, and more specifically, to an adjustment assembly which ensures proper operation of the interlock device following installation of the cable assembly into the vehicle.

2. Description of the Prior Art

Interlock devices are incorporated into vehicle control mechanisms to prevent the transmission from being shifted out of the park position unless the brake pedal is depressed. Typically, the cable assembly includes a conduit with a core element movably disposed therein. One end of the core element is secured to the transmission and the other end of the core element is secured to the shifter, such as a column shift lever. The column shift lever transmits movement to the transmission through the core element. One type of interlock device operates by engaging an element associated with the core element to prevent its movement unless the brake pedal is depressed. This is achieved by utilizing a solenoid that is actuated by a brake pedal signal. It is desirable to provide an interlock device that is integral with the cable assembly to reduce the number of components required for the interlock system. To this end, interlock devices have been developed that are integral with the cable assembly and which utilize a pin transverse to an aperture associated with the core element. The pin engages the aperture to prevent its movement. Once such device is disclosed in U.S. Pat. No. 5,647,818 issued on Jul. 15, 1997 to Moody.

The alignment of the pin and aperture is critical to ensure proper operation of the interlock device. During installation of the cable assembly into the vehicle, the core element must be moved within the conduit to connect the ends of the cable assembly to their respective shifter components. As a result, the position of the aperture may change slightly with respect to the pin and cause the interlock device to operate improperly. Other interlock devices that are non-integral with the cable assembly do not present this alignment problem because the brackets that are used to support the components may align the features. Therefore, what is needed is an adjustment assembly to ensure proper operation of the integral shifter cable interlock after installation of the cable assembly into the vehicle.

SUMMARY OF THE INVENTION AND ADVANTAGES

The present invention provides an adjustment assembly for an integral shifter cable interlock. The assembly includes a cable assembly having a conduit defining an axis and a core element disposed within the conduit movable along the axis. A terminal assembly is secured to a portion of the core element and has an aperture. An interlock housing is supported by the cable assembly with the terminal assembly at least partially disposed within the interlock housing. An interlock device is disposed within the interlock housing and has an armature pin transverse to the aperture for coacting with the aperture and preventing axial movement of the core element. The adjustment assembly is characterized by a removable clip interposed between the interlock housing and the terminal assembly for locating the aperture relative to the armature pin.

Accordingly, the present invention provides an adjustment assembly that ensures proper operation of the integral shifter cable interlock after installation of the cable assembly into the vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
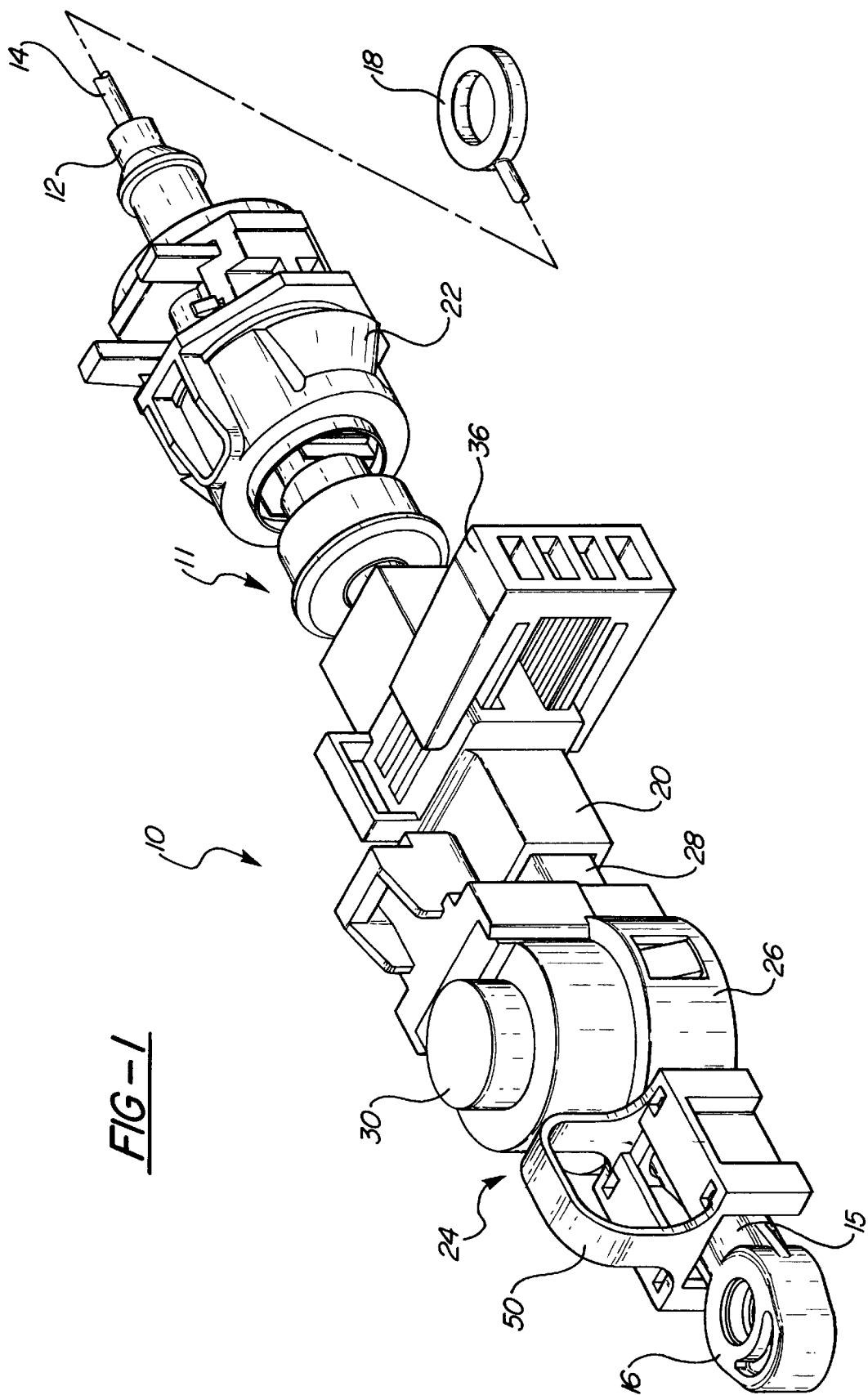
FIG. 1 is a perspective view of an adjustment assembly of the present invention on for an integral shifter cable interlock.

Referring to the Figures, wherein like numerals indicate like or corresponding parts throughout the several views, an adjustment assembly for an integral shifter cable interlock is generally shown at 10 in FIG. 1. The assembly 10 includes a cable assembly, generally shown at 11, having a conduit 12 defining an axis A and a core element 14 is disposed within the conduit 12 which is movable along the axis A. A terminal assembly 15 is secured to a portion of the core element 14. The terminal assembly 15 further includes an end connector 16 adapted for connection to a shifter (not shown), such as a column shifter. One end 18 of the core element 14 is secured to the transmission, as is known in the art, and the other end of the core element 14, which has the terminal assembly 15, is secured by the end connector 16 to the shifter, in a manner known in the art. The column shift lever transmits movement to the transmission through the core element 14.

Figure 2:
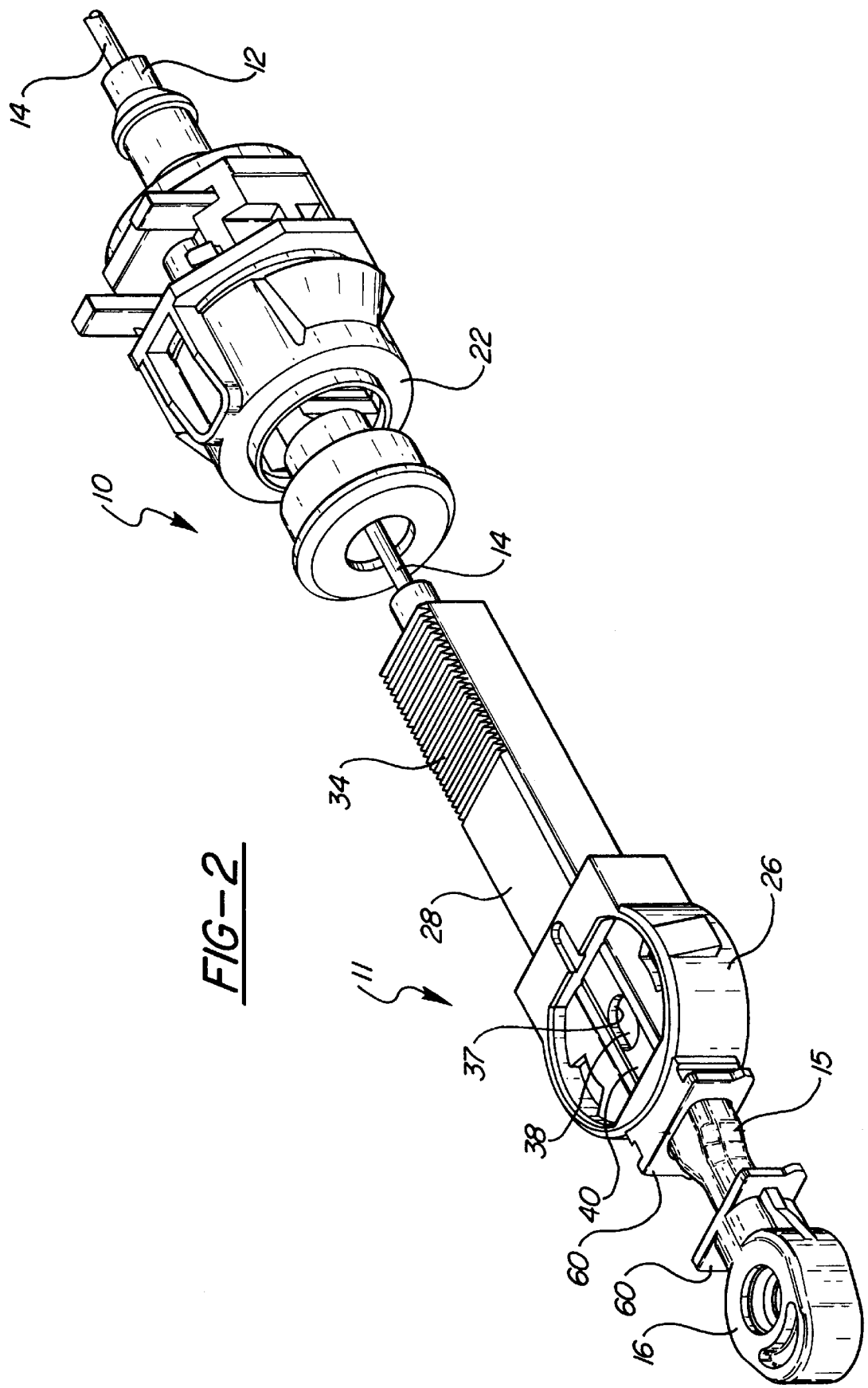
FIG. 2 is a perspective view of the present invention similar to FIG. 1 with a portion of an interlock housing and swivel tube removed.

The cable assembly 11 includes a swivel tube 20 that is pivotally connected to a mounting member 22. The mounting member 22 is connected to a support member (not shown) in a vehicle for supporting the cable assembly 11. The swivel tube 20 permits the end of the cable assembly 11 to be positioned for attachment to the shifter. An interlock housing, generally shown at 24, is supported on the cable assembly 11 and includes a lower portion 26 having a base portion 28 and an upper portion 30 which is secured to the lower portion 26. The base portion 28 is slidably received within the swivel tube 20, or second housing, and has a plurality of teeth 34 thereon, as best shown in FIG. 2. The swivel tube 20 supports a movable lock 36 for engaging the teeth 34 and preventing axial movement of the interlock housing 24 relative to the swivel tube 20. The swivel tube 20, base portion 28, and lock 36 cooperate to adjust the tension in the cable assembly 11 once it has been installed in the vehicle.

Figure 3:
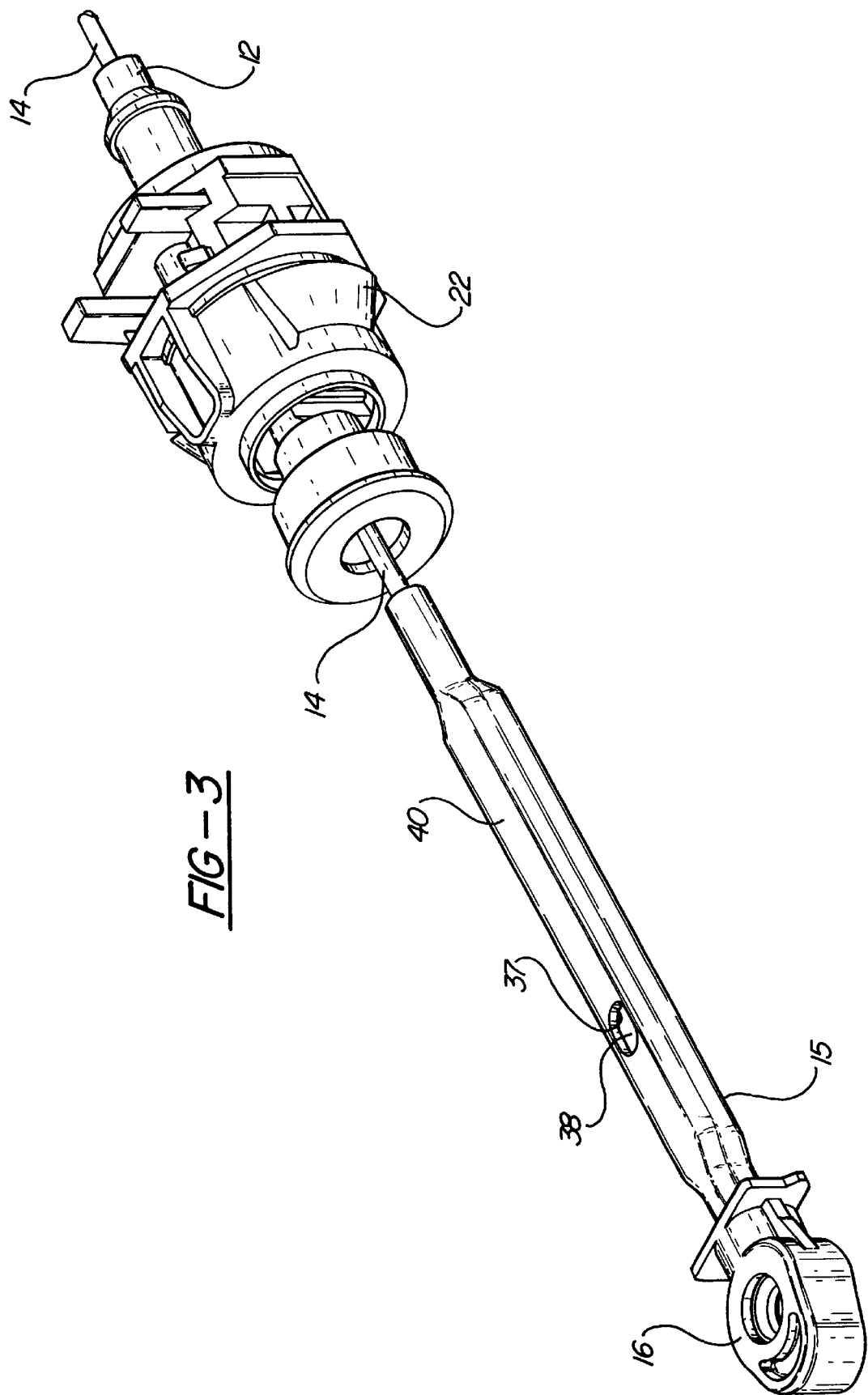
FIG. 3 is a perspective view of the present invention similar to FIG. 2 with another portion of the interlock housing removed.

Referring to FIGS. 2 and 3, the terminal assembly 15, which has an aperture 37, is at least partially disposed within the interlock housing 24. The terminal assembly 15 is formed by a metal shaft 38 that is secured to the core element 14 with a polymeric material 40 molded onto the portion of the core element 14. The polymeric material 40 defines the aperture 37, which is preferably in the shape of an elongated recess.

Figure 4:
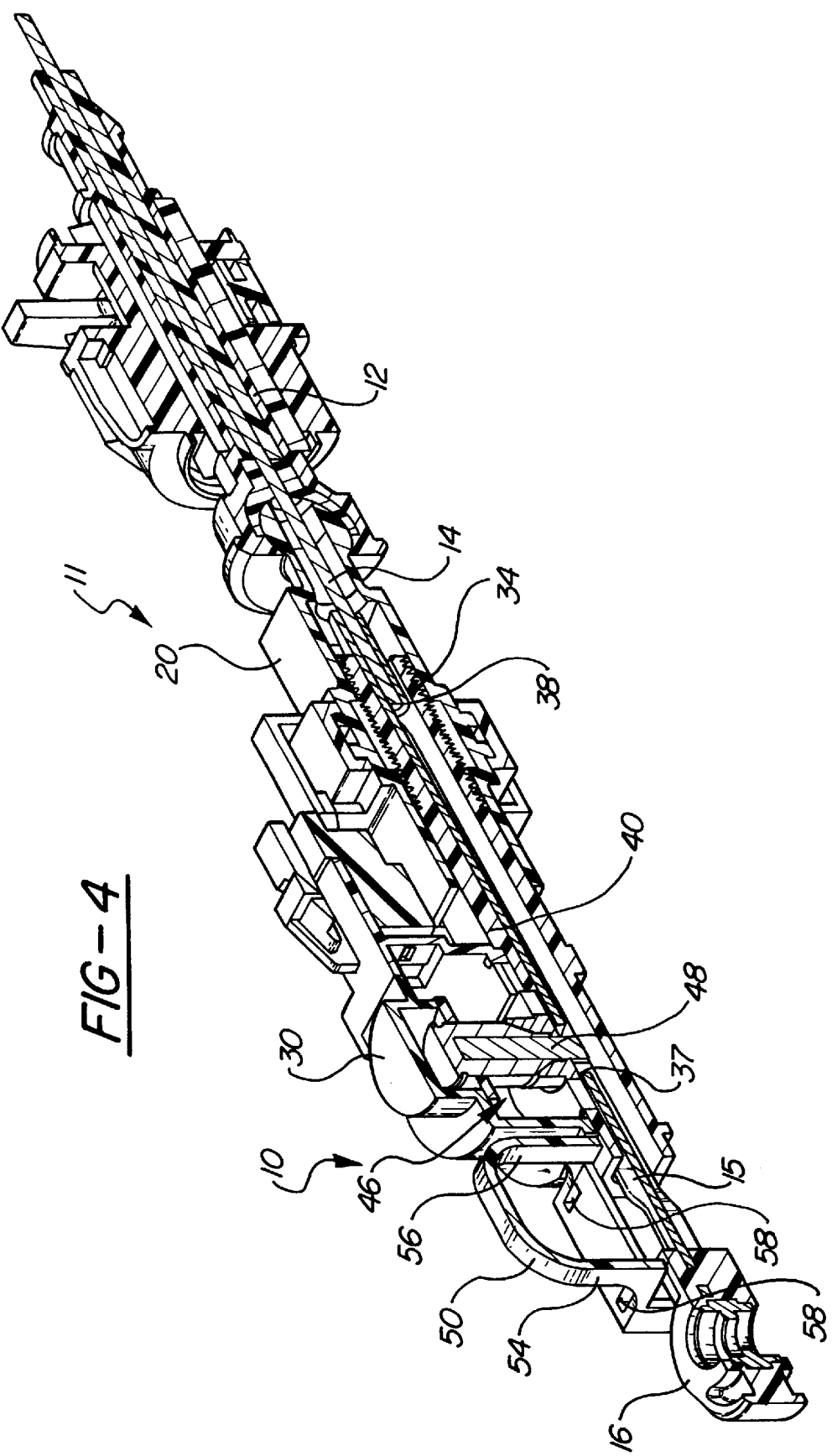
FIG. 4 is a cross-sectional view taken along lines 5—5 in FIG. 1.

An interlock device such as a solenoid, generally shown at 46 in FIG. 4, is dispose within the interlock housing 24. The interlock device 46 has an armature pin 48 transverse to the aperture 37 for coacting with the aperture 37 and preventing axial movement of the core element 14. Said another way, the armature pin 48 is received in the aperture 37 to prevent axial movement of the core element 14 to prevent the transmission from being shifted. To this end, the core element 14 includes a park position in which the armature pin 48 aligns with the aperture 37. Since the cable assembly 11 is adjusted upon installation into the vehicle, the core element 14 and aperture 37 tends to shift relative to the armature pin 48 thereby creating a misalignment. To prevent this condition, the present invention incorporates a removable clip 50 to preserve the alignment between the aperture 37 and armature pin 48 after installation.

The removable clip 50 retains the core element 14 in the park position. The clip 50 is interposed between the interlock housing 24 and the terminal assembly 15 to prevent relative movement and to locate the aperture 37 relative to the armature pin 48. The removable clip 50 comprises a U-shaped member defining a handle 52 and opposing legs 54 and 56, or first and second portions, depending downwardly form the handle 52 with the legs 54, 56 having receptacles 58. The interlock housing 24 and the terminal assembly 15 include tabs 60 that are received by the receptacles 58. The receptacle 58 securely engaging the tabs 60 so that the interlock housing 24 and terminal assembly 15 are not permitted to move relative to one another during installation.

Figure 5:
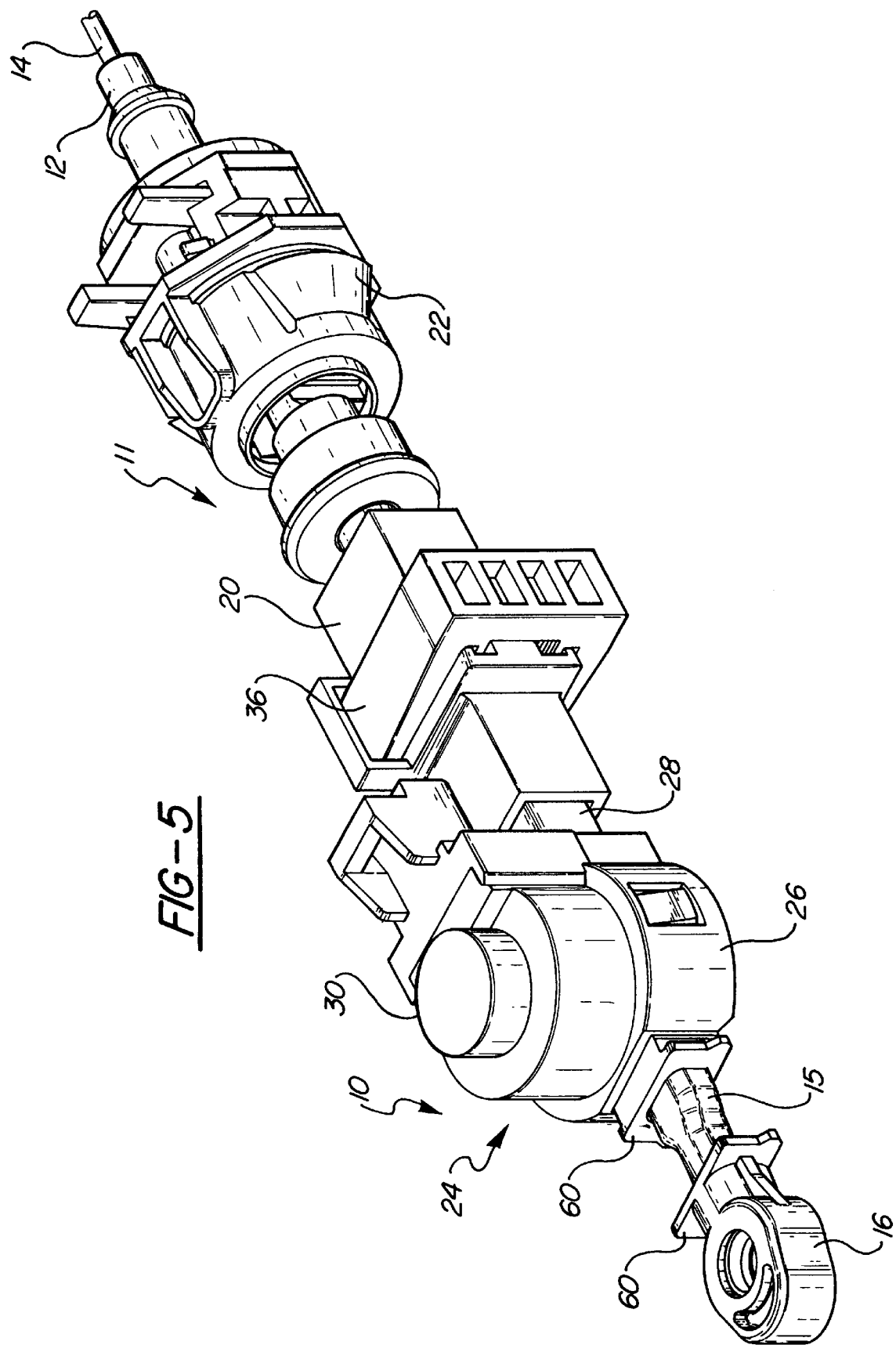
FIG. 5 is a perspective view of the present invention similar to FIG. 1 in an installed position.

The cable assemblies 11 are shipped to the assembly plant with the locks 36 in the unlocked position so that the base portion 28 may move relative to the swivel tube 20. Further, the cable assemblies 11 are shipped with the removable clip 50 secured to the interlock housing 24 and the terminal assembly 15 to maintain alignment of the aperture 37 with the armature pin 48. During installation, the first end 18 is secured to the transmission and the second end 16 is secured to the shifter. The core element 14 may move up to 15 mm within the conduit during installation. The tension is then adjusted in the cable assembly 11 by adjusting the interlock 24 and second 20 housings relative to one another. The movable lock 36 is depressed to engage the teeth 34, as shown in FIG. 5, thereby locking the interlock 24 and second 20 housings together. Once the cable assembly 11 has been properly installed and adjusted the clip 50 may be removed. By using the clip during installation, proper alignment of the aperture 37 and armature in 48 in the park position is ensured.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An adjustment assembly (10) comprising:

a cable assembly (11) having a conduit (12) defining an axis and a core element (14) disposed within said conduit (12) and movable along said axis;

a terminal assembly (15) secured to a portion of said core element (14), said terminal assembly (15) having an aperture (37) and an end connector (16);

an interlock housing (24) supported by the cable assembly (11) with said terminal assembly (15) at least partially disposed within said interlock housing (24) and said end connector (16) of said terminal assembly (15) at least partially disposed outside of said interlocking housing (24);

an interlock device (46) disposed within said interlock housing (24) having an armature pin (48) transverse to said aperture (37) for coacting with said aperture (37) and preventing axial movement of said core element (14); and said adjustment assembly (10) characterized by a removable clip (50) interposed between said interlock housing (24) and said terminal assembly (15) for locating said aperture (37) relative to said armature pin (48).

2. An adjustment assembly (10) as set forth in claim 1 further comprising a swivel tube (20) and wherein said interlock housing (24) includes a base portion (28) having teeth (34) which are received within said swivel tube (20), said swivel tube (20) supporting a movable lock (36) for engaging said teeth (34) and preventing axial movement of said interlock housing (24) relative to said swivel tube (20).

3. An adjustment assembly (10) as set forth in claim 1 wherein said core element (14) includes a park position in which said armature pin (48) aligns with said aperture (37), said removable clip (50) retaining said core element (14) in said park position.

4. An adjustment assembly (10) as set forth in claim 3 wherein said removable clip (50) includes first (54) and second (56) spaced apart portions, said first portion (54) engaging said interlock housing (24) and said second portion (56) engaging said terminal assembly (15).

5. An adjustment assembly (10) as set forth in claim 4 wherein said interlock housing (24) and said terminal assembly (15) include tabs (60), and said first (54) and second (56) portions include receptacles (58) for securely engaging said tabs (60).

6. An adjustment assembly (10) as set forth in claim 5 wherein said removable clip (50) comprises a U-shaped member defining a handle (52) and opposing legs (54, 56) depending downwardly from said handle (52) with said legs (54, 56) having said receptacles (58).

7. An adjustment assembly (10) as set forth in claim 1 wherein said terminal assembly (15) comprises a metal shaft (38) secured to said core element (14) with a polymeric material (40) molded onto said portion of said core element (14) and said polymeric material (40) defining said aperture (37).

8. An adjustment assembly (10) as set forth in claim 7 wherein said aperture (37) comprises an elongated recess.

9. An adjustment assembly (10) as set forth in claim 1 wherein said removable clip (50) is interposed between said interlocking housing (24) and said end connector (16).

* * * * *